Oct. 17, 1967          J. HRABE          3,347,150

SEMI-AUTOMATIC COFFEE URN

Filed Sept. 16, 1965          2 Sheets-Sheet 1

INVENTOR
Jerry Hrabe

Leonard S. Knox
Atty

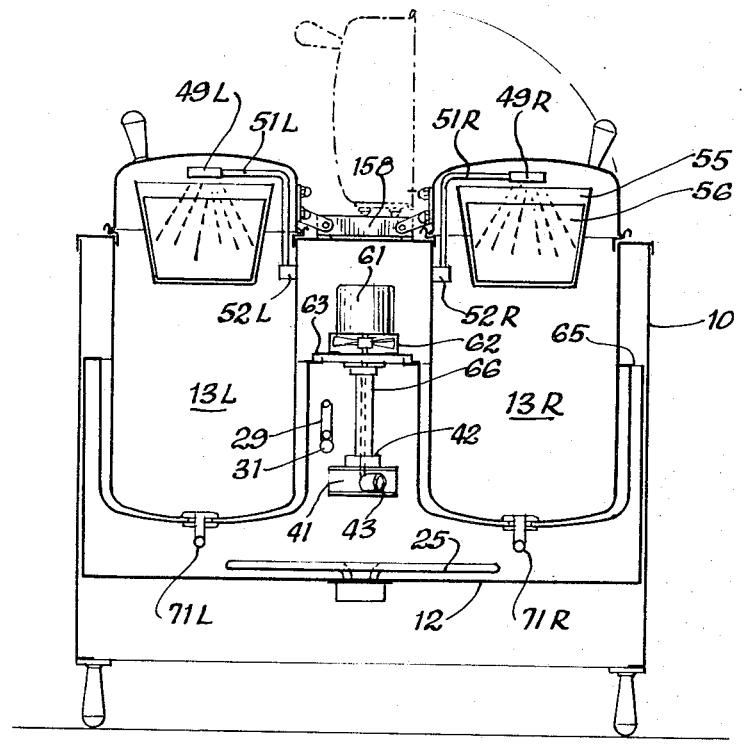
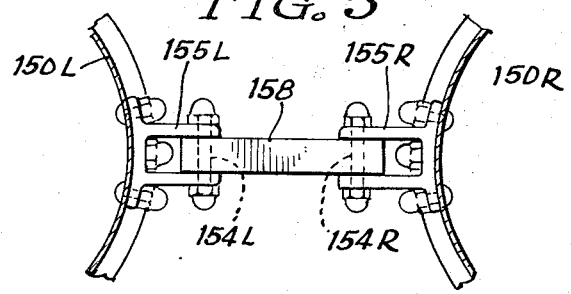
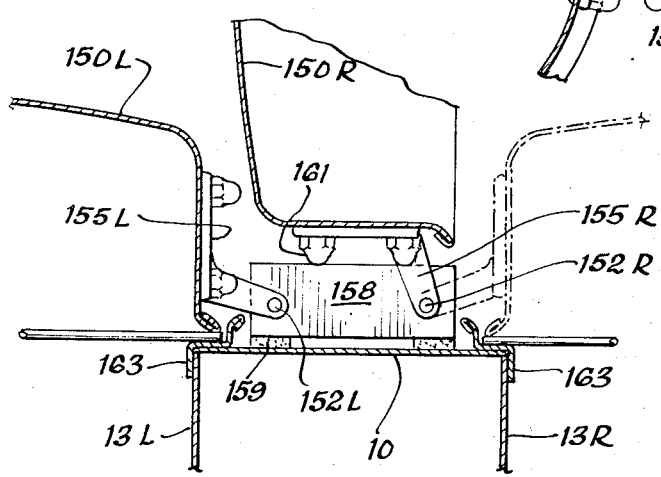

United States Patent Office 3,347,150
Patented Oct. 17, 1967

3,347,150
SEMI-AUTOMATIC COFFEE URN
Jerry Hrabe, Chicago, Ill., assignor to Superior Tea & Coffee Co., Chicago, Ill.
Filed Sept. 16, 1965, Ser. No. 487,849
3 Claims. (Cl. 99—283)

This invention relates to a semi-automatic coffee brewing urn. More particularly it has reference to electro-mechanical means partly under the control of the operator and partly automatic, whereby the commercial preparation of coffee may be more expeditiously accomplished and in a fool-proof manner.

Prior commercial coffee urns generally comprise a vessel in which water is heated and one or more adjacent vessels in which the coffee is brewed and stored for serving. Frequently such grouping is referred to as a "coffee urn." The brewing and storage vessel includes a basket of cloth or other porous material at the top surmounted by a spray in communication with the hot water vessel. Heretofore, when a batch of coffee is to be brewed, the operator will put a measured quantity of ground coffee in the basket and, by means of a hand-operated valve, cause a proportionate quantity of water to be sprayed over the coffee. Following transfer of hot water, the operator must, by means of another valve, replenish the hot water vessel by operating another valve in the supply line. Obviously, while transferring the proper volume of water and attending to make-up water, the operator must remain at the urn thus interfering with other, and perhaps more pressing duties.

Accordingly, the principal object of this invention resides in the provision of a coffee urn characterized by means which relieves the operator of the manual routine just set forth, except for replenishment of water in the hot water reservoir due to loss by evaporation and that used for tea, which may be done at odd intervals.

Another object is to provide a semi-automatic coffee urn as aforesaid including means for automatic replenishment of water in the reservoir equal in amount to that withdrawn therefrom and transferred for brewing.

A further object is to provide automatic means capable of being initiated into a cycle by the operator to transfer a predetermined volume of hot water for the brewing process and to terminate the cycle automatically.

Still another object lies in the provision of means whereby, in the event of some unanticipated contingency, the operator may terminate the water-transferring cycle.

Inasmuch as each coffee vessel is provided with a hinged top cover and it is desirable that both covers be removable during cleaning, it is another object to provide an improved arrangement of a pair of such covers which may be bodily removed to one side while allowing each cover to be hinged independently for access to its individual vessel.

Other objects and advantages of the invention will become apparent from the ensuing description which, taken with the accompanying drawings, discloses a preferred mode of carrying the invention into practice.

In these drawings:

FIG. 2 shows a vertical cross section, with some parts in elevation;

FIG. 4 is a combined cross-sectional and elevational detail to show the novel lid-mounting means; and FIG. 5 is a top plan detail of the showing of FIG. 4.

Figure 1:
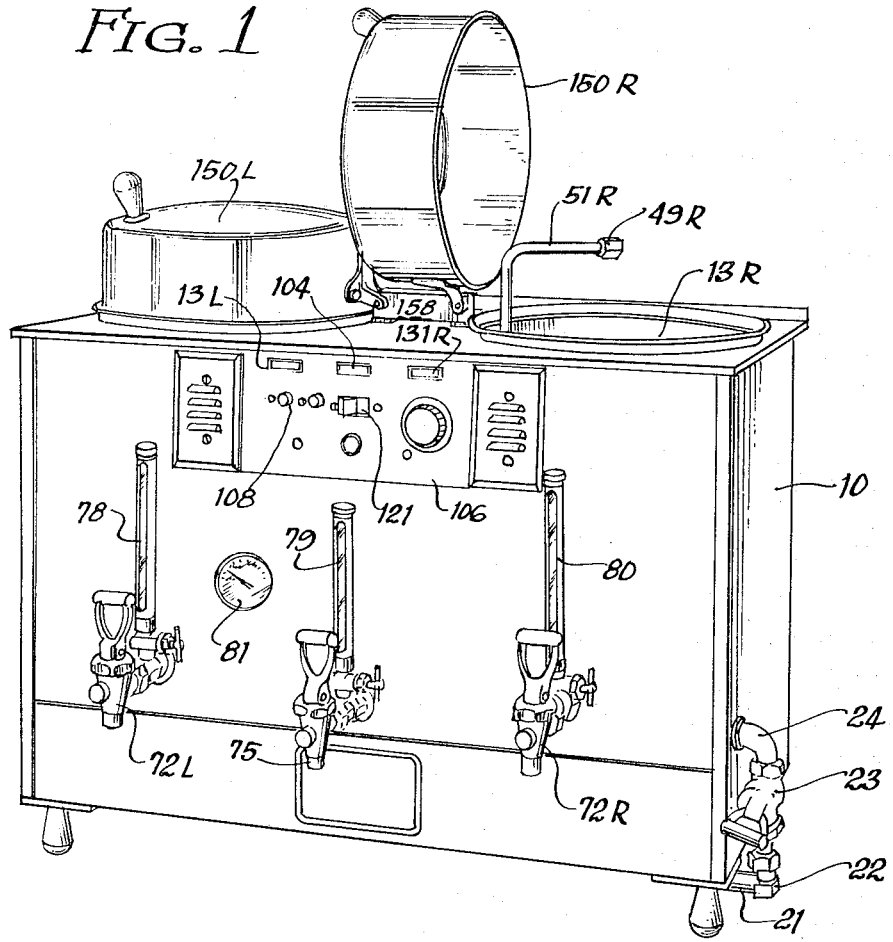
FIG. 1 is a perspective view of a coffee urn embodying the invention.

Broadly regarded, the invention comprises a coffee urn which has a reservoir in which water is heated, together with one or more vessels in which the coffee is brewed utilizing water transferred from the hot water reservoir. In connection with the latter conventional means are provided for electrical heating of the water, for regulating the temperature thereof and for automatic interruption of current to the heater in the event the water level should fall to a dangerous value. The respective spray nozzles for each coffee vessel are connected through individual, solenoid-operated valves to the discharge side of a pump which, in turn, has its inlet connected to the hot water reservoir. By the use of electrical switching means either valve may be selected to connect one or the other spray to the hot water supply. Another solenoid-operated valve is in a line from the cold water supply to the hot water reservoir, and the operating coil thereof is in parallel with the pump motor. Thus, as the pump is delivering its quota of hot water to a spray nozzle, make-up water in the same amount is delivered to the hot water reservoir, to maintain a constant level.

Timing means is provided, and is so adjusted with respect to the rate of the pump, that an amount of water sufficient for one batch of coffee is automatically transferred. The timed cycle is initiated through a manual switch, and there is also an emergency "stop" arranged to interrupt current to the timer motor, the pump motor and the cold water supply valve. Selection of either of the two coffee vessels is through a manually-operated selector switch.

In another aspect the invention comprehends a mounting of the respective top covers of the two coffee vessels whereby one or the other may be raised for access to the coffee basket for loading and whereby both covers may be bodily removed, as a unit, for cleaning. The mounting arrangement comprises a free block common to both covers and upon which both covers are hinged. Since the block is free of the framework, one cover tends to anchor the same while the other cover is raised, and vice versa.

Thus, reverting to the drawings, there is shown, by way of example, a coffee urn comprising an outer casing 10 within which is mounted a hot water reservoir 12 desirably of the form shown, namely, having wall portions partially circumjacent the left and right coffee brewing vessels 13L and 13R. By extending the walls of the reservoir 12 in the stated manner the hot water will, by radiation, maintain the brewed coffee at a tolerable serving temperature although, if desired, separate heaters may be used for that purpose. Water is supplied to the reservoir 12 from a line 21, through a suitable pressure regulator 22, through a manually-operated valve 23 and a pipe 24 to the reservoir. Thus make-up water may be admitted to compensate for water drawn off for tea or other purposes and loss due to evaporation. Another line leads from the supply line 21 to an automatically-operated valve to be described.

Water in the reservoir 12 is heated by an electric element 25 with which is associated a low-water cut-off 27. The line admitting make-up water, indicated at 29 in FIG. 2, supports a thermostat 31 functioning in the customary manner to control the heater 25. By mounting the thermostat adjacent the point of entry of cold water the same switches the heater "on" more rapidly than if positioned elsewhere.

A pump 41 has an intake port 42 and a discharge port 43. This latter is connected to a Siamese fitting (not shown) the branches of which are connected to one side of respective left and right solenoid valves 46L and 46R through pipes 47L and 47R (FIG. 3), and the other side of the valves is connected to the respective spray nozzles 49L and 49R through pipes 51L and 51R. These latter are arranged to swivel at 52L and 52R, as is common practice.

Each coffee brewer is provided with a support 55 to receive a filter 56 to contain the ground coffee. Inasmuch as these features are conventional they require no elaboration.

The pump 41 is driven by an electric motor 61 which is preferably cooled by a fan 62. The base 63 of the pump is secured to the upper wall 65 of the reservoir 12 while the shaft housing 66 protrudes through an aperture cut in the wall.

Brewed coffee is dispensed through pipes 71L and 71R terminated in valves 72L and 72R. Hot water for tea, etc. may be drawn from the reservoir 12 through a valve 75. The numerals 78, 79 and 80 indicate the usual gauge glasses, and 81 refers to a gauge to indicate the temperature of the hot water.

Figure 3:
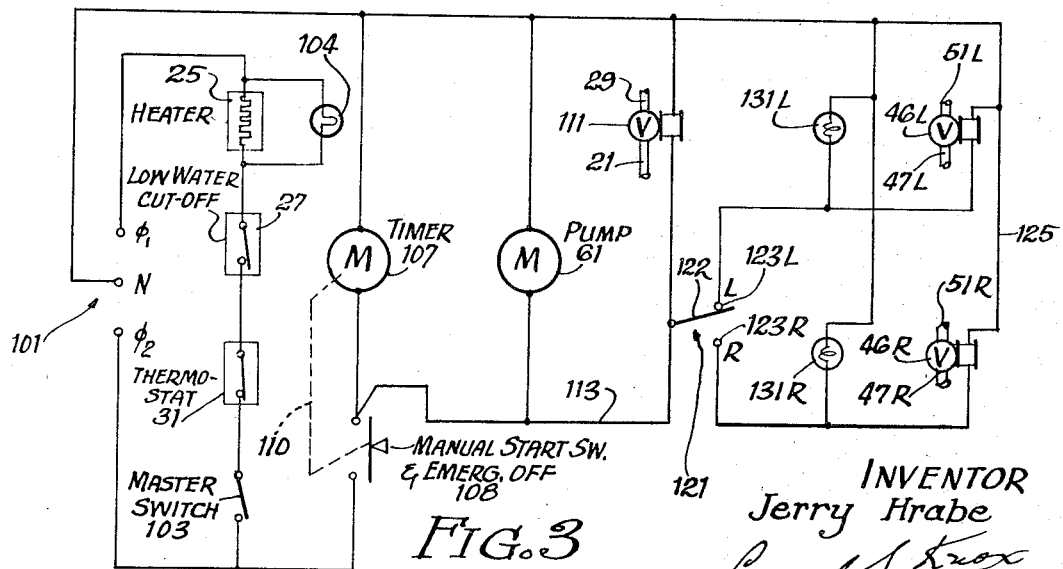
FIG. 3 is a diagram illustrating in schematic form, the electric circuitry and certain electro-mechanical components.

Referring now to FIG. 3 a source of power 101, in this case 220 volts A.C. between $\phi_1$ and $\phi_2$ and 110 volts A.C. between either N–$\phi_1$ or N–$\phi_2$, is connected as shown to the several electrical components now to be described. The heater 25, low water cut-off switch 27, thermostatic switch 31 and a master switch 103 are connected in series across $\phi_1$ and $\phi_2$. Thus, assuming the master switch 103 is closed, the heater operates to heat the water in the reservoir 12, with the switches 27 and 31 functioning in the manner heretofore pointed out. Preferably, a pilot lamp 104 is connected in parallel with the heater 25 to indicate that the same is "on." Such lamp is located on a front panel 106.

A timing motor 107 is connected in series with a cycle control switch 108 which is arranged to be closed manually and opened automatically by a cam driven by the timer motor. Such cam-operated means is indicated by the broken line 110. The switch 108 is also arranged to be opened manually to terminate the cycled operations in the event of an emergency.

The pump motor 61 and make-up solenoid valve 111 are connected across the conductor 113 and the line N and are therefore in parallel with the timer motor 107. Thus, upon closing of the switch 108 the pump is started and the valve 111 opened, thereby to transfer hot water to the selected spray line 51L or 51R while make-up water is delivered to the reservoir 12. The rate of flow of water through the valve 111 is regulated to be equal to the delivery rate of the pump 41. Consequently the required level of hot water is maintained in the reservoir 12. Any additional replenishment is effected by manual operation of the valve 23. When the timer opens the switch 108 the circuit to the pump motor and the valve 111 is interrupted, and the latter will close automatically. These same events will, of course, occur should the switch 108 be opened manually.

The operator will select either of the vessls 13L or 13R by means of a single-pole double-throw selector switch 121. The blade 122 of this switch is manually actuatable and will remain on the contact to which it is moved, i.e. either 123L or 123R. Each contact is connected to respective ones of the solenoid valves 46L or 46R, the other side whereof is connected to a bus 125 which is connected to N. Numerals 131L and 131R represent pilot lamps to evidence the side upon which coffee is then being brewed, i.e. the "left" or "right" side.

It will be understood that when one of the vessels 13L or 13R has been emptied the blade 122 will be actuated to the opposite contact for brewing of the next batch of coffee, and that the switch 108 will be manually re-closed to initiate the cycle.

The arrangement described is such that hot water may be drawn from the reservoir for tea, etc. without affecting the transfer of hot water to a coffee-brewing vessel.

Adverting to FIGS. 4 and 5 each of the vessels 13L and 13R is provided with an individual cover 150L and 150R. These covers per se are of the customary type and have recognized uses. In accordance with the invention each cover is pivoted at 152R and 152L, e.g. by means of studs 154R and 154L, the respective hinge parts being shown at 155R and 155L. The pivots 154L and 154R are received in bores at respective ends of a block 158 which may be provided with pads of sponge rubber or the like to obviate damage to the polished surface of the casing 10, upon which the block rests. The block is desirably so dimensioned that the cap nuts 161 securing the hinge parts 155L and 155R abut the same when the respective cover is opened, whereby to serve as a back stop.

Inasmuch as the cover is preferably nested in a flanged part 163 at the top of the vessels the same is proof against inadvertent dislodgment. When a selected cover is to be raised the other cover will maintain the block 158 immobile. However both covers and the common block may be bodily removed when desired.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

I claim:

1. Coffee brewing apparatus comprising a reservoir to hold a supply of water, means to maintain the water in heated condition, a plurality of coffee brewing vessels to receive individual charges of ground coffee, each vessel including outlet means to deliver hot water over the ground coffee at some predetermined rate, electric motor-driven pressuring means having intake and discharge ports, said intake port being in fluid communication with the reservoir, a solenoid valve individual to each vessel, said discharge port being connected in common to one side of each valve, the other side of each valve being connected to an individual one of the outlet means, a source of power, a selector switch to condition one of said valves for opening, a second switch, circuit means connecting said switches, solenoid valves, and pressuring means to said power source, closure of said second switch energizing said pressuring means and selected solenoid valve concurrently to deliver hot water to the selected vessel, a conduit connected to a water main, a solenoid valve having an inlet side connected to the main and an outlet side delivering water to the reservoir, said last mentioned valve being connected in circuit with said electric motor to be in open condition concurrently with running of the motor, the rate of flow through said last mentioned valve being regulated to replace water in said reservoir at said predetermined rate.

2. The combination in accordance with claim 1 further characterized by timing means in operative relation with said second switch, said second switch being adapted for manual closing and for mechanical opening by said timing means.

3. Coffee brewing apparatus comprising a reservoir to hold a supply of water, means to maintain the water in heated condition, a coffee brewing vessel to receive a charge of ground coffee, means to transfer hot water from the reservoir for delivery over the coffee to brew the same, means connecting the reservoir to a fresh water supply, pressuring means in operative relation with the supply and reservoir to replenish the volume of water in the reservoir at the same rate as the same is depleted by transfer to the vessel, and timing means having a cycle proportioned to the rate of delivery of the pressuring means, said timing means adapted to be initiated into its cycle manually and to be terminated automatically upon transfer to the vessel of a predetermined volume of hot water.

References Cited
UNITED STATES PATENTS

| | | | |
|---|---|---|---|
| 2,568,840 | 9/1951 | Zees | 99—291 X |
| 2,666,379 | 1/1954 | Kaminsky | 99—291 X |
| 2,706,444 | 4/1955 | Chaplik | 99—282 |
| 3,119,322 | 1/1964 | Valente | 99—291 |

ROBERT W. JENKINS, *Primary Examiner.*

S. P. FISHER, *Assistant Examiner.*